US012160660B2

United States Patent
Myojin

(10) Patent No.: US 12,160,660 B2
(45) Date of Patent: Dec. 3, 2024

(54) ELECTRONIC APPARATUS, METHOD FOR CONTROLLING THE SAME, AND COMPUTER-READABLE STORAGE MEDIUM STORING PROGRAM

(71) Applicant: CANON KABUSHIKI KAISHA, Tokyo (JP)

(72) Inventor: Rie Myojin, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 18/178,153

(22) Filed: Mar. 3, 2023

(65) Prior Publication Data

US 2023/0291998 A1 Sep. 14, 2023

(30) Foreign Application Priority Data

Mar. 9, 2022 (JP) .................. 2022-036303

(51) Int. Cl.
*H04N 23/63* (2023.01)
*H04N 5/262* (2006.01)
*H04N 5/77* (2006.01)
*H04N 23/611* (2023.01)
*G06V 40/16* (2022.01)

(52) U.S. Cl.
CPC ......... *H04N 23/632* (2023.01); *H04N 5/2628* (2013.01); *H04N 5/77* (2013.01); *H04N 23/611* (2023.01); *G06V 40/171* (2022.01)

(58) Field of Classification Search
CPC ...... H04N 23/632; H04N 5/2628; H04N 5/77; H04N 23/611; H04N 23/62; H04N 23/698; H04N 23/90; G06V 40/171; G06V 10/25; G06V 40/166
See application file for complete search history.

(56) References Cited

U.S. PATENT DOCUMENTS

| | | | |
|---|---|---|---|
| 10,200,597 B2* | 2/2019 | Choi | H04N 23/62 |
| 2018/0069983 A1* | 3/2018 | Cho | H04N 23/632 |
| 2019/0289201 A1 | 9/2019 | Nishimura et al. | |
| 2023/0325980 A1* | 10/2023 | Choi | G11B 27/031 |
| 2023/0421889 A1* | 12/2023 | Cui | H04N 23/69 |
| 2024/0203012 A1* | 6/2024 | Kang | H04N 23/633 |

FOREIGN PATENT DOCUMENTS

JP 2020162139 A 10/2020

* cited by examiner

*Primary Examiner* — Shahbaz Nazrul
(74) *Attorney, Agent, or Firm* — Canon U.S.A., Inc. IP Division

(57) ABSTRACT

An electronic apparatus including camera units that capture images with different angles of view includes a first acquisition unit that acquires live-view images by starting imaging processing using the camera units, a setting unit that sets cut-out ranges for the respective live-view images, a display control unit that displays first cut-out images generated by performing cut-out processing on the respective live-view images based on the cut-out ranges, a selection unit that selects one of the first cut-out images, an identification unit that identifies the camera unit corresponding to the selected first cut-out image, a second acquisition unit that acquires a captured image by performing imaging processing using the identified camera unit, and a recording control unit that records, in a recording medium, a second cut-out image generated by performing cut-out processing on the captured image based on the cut-out range corresponding to the selected first cut-out image.

7 Claims, 17 Drawing Sheets

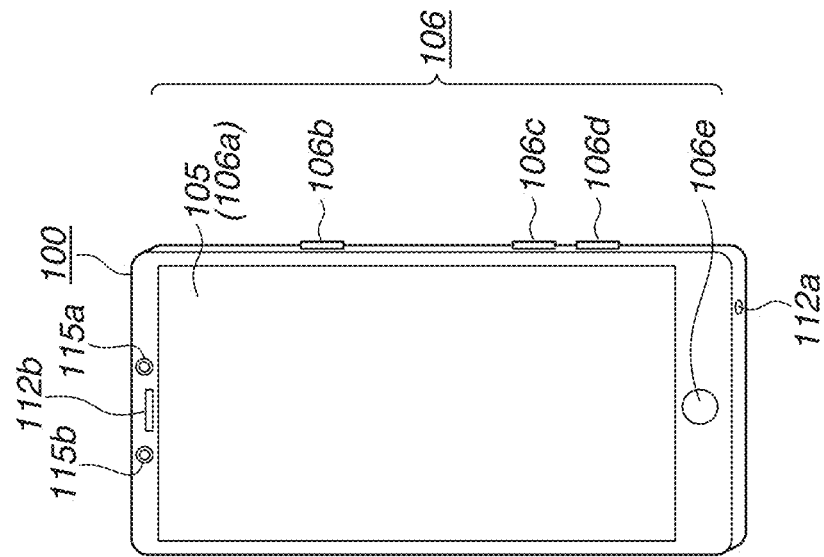
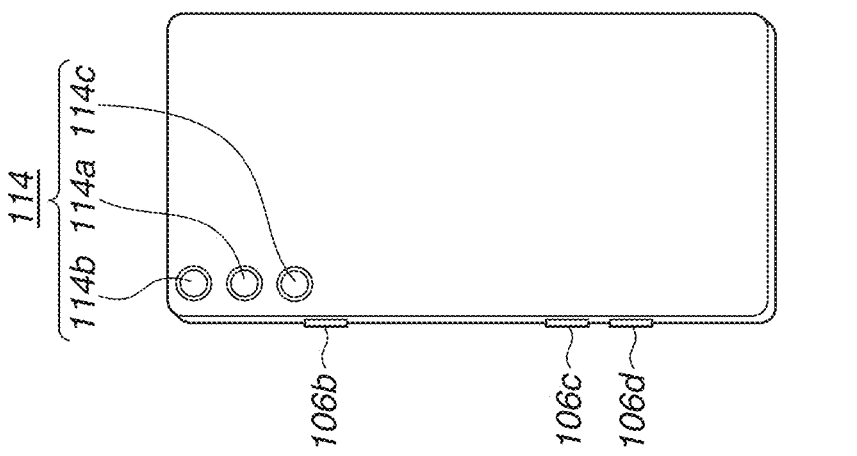
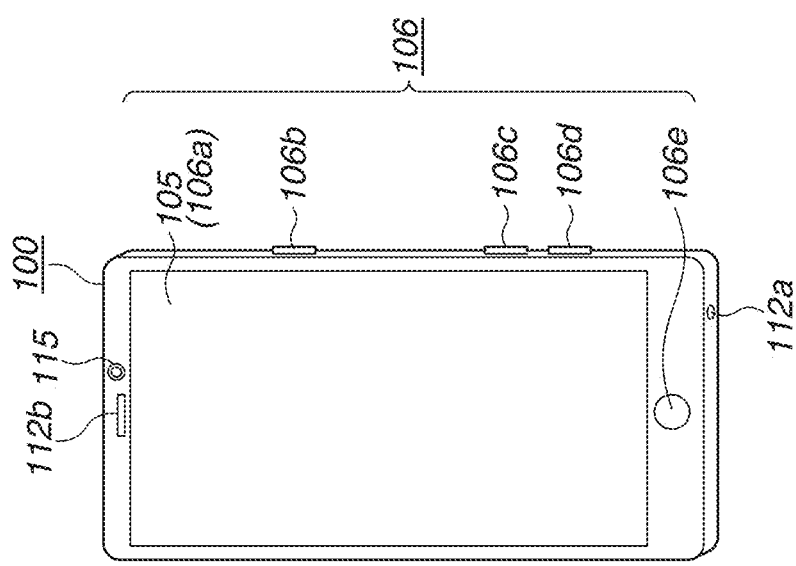

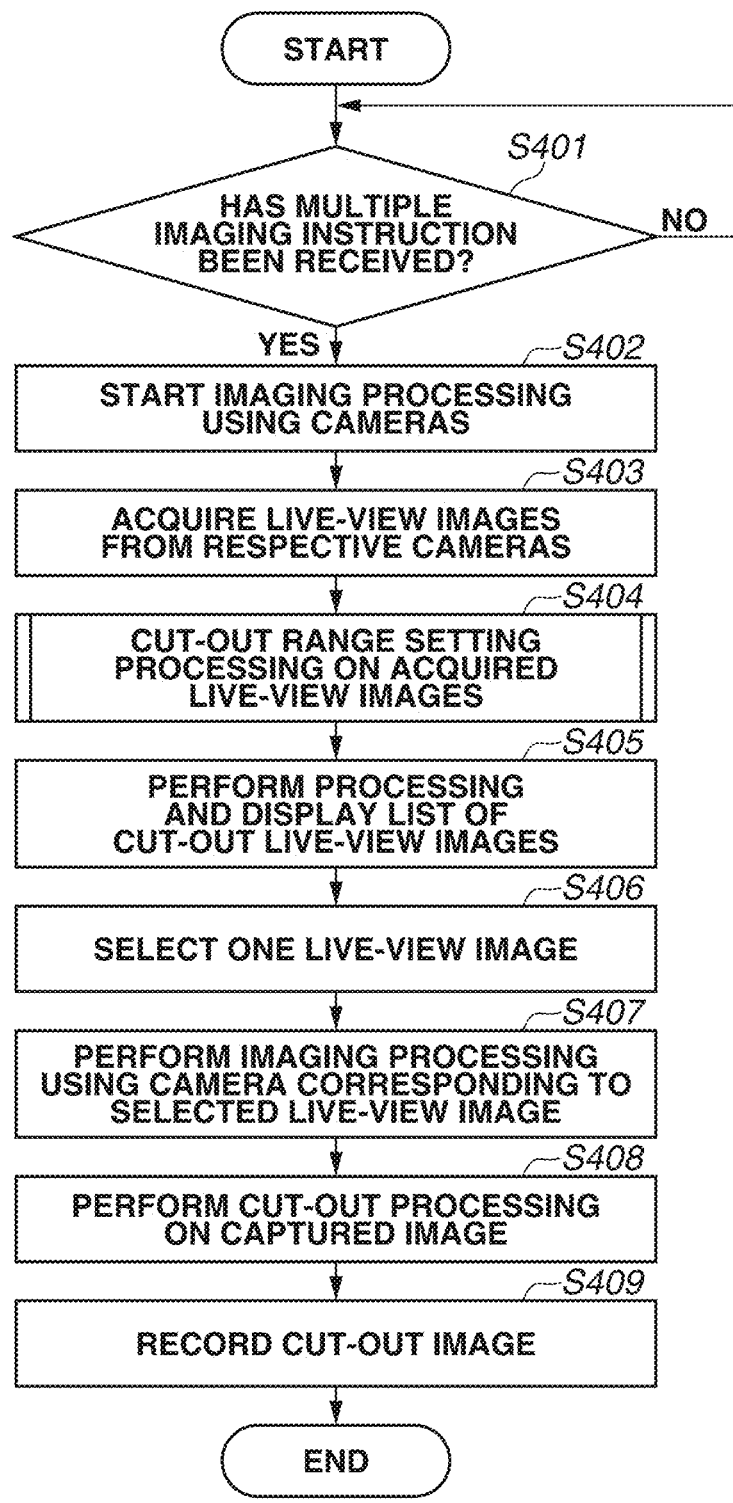

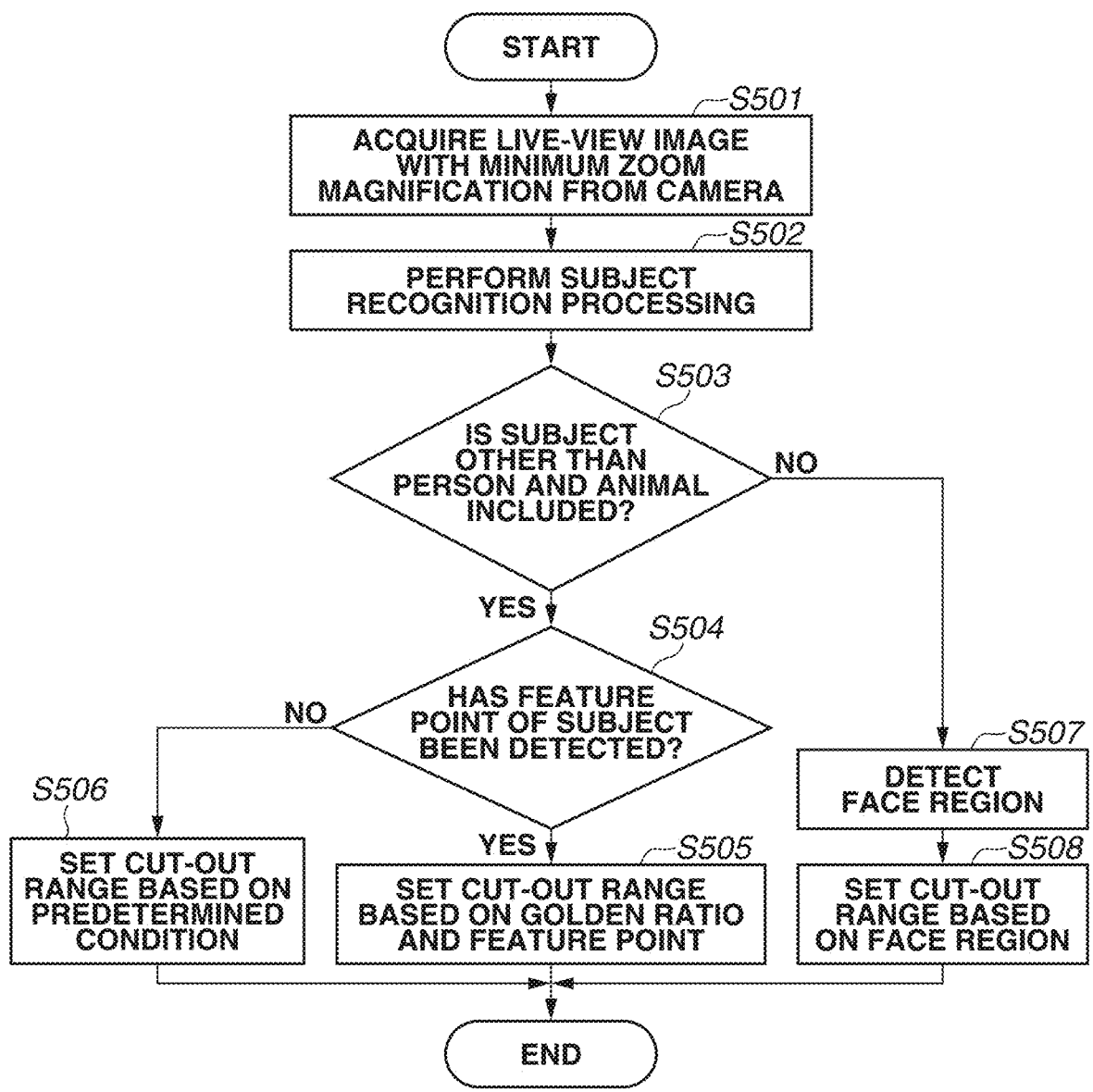

FIG.7
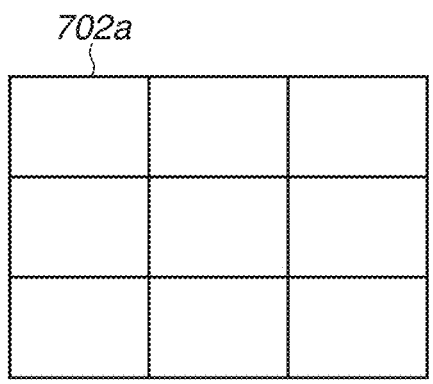
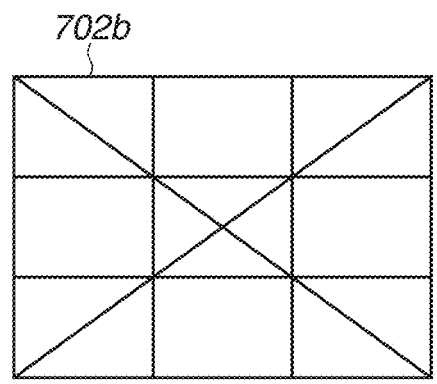
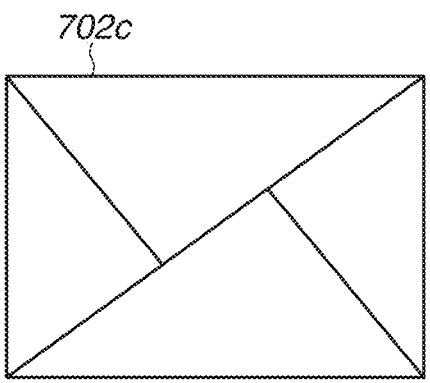
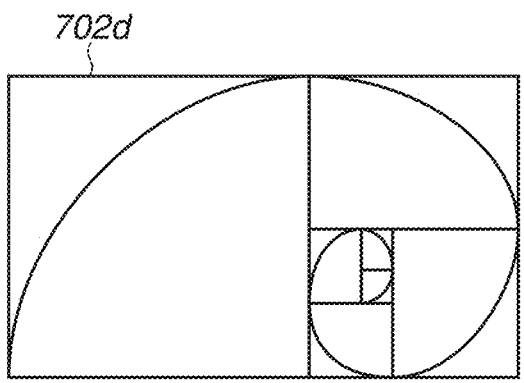

FIG.8
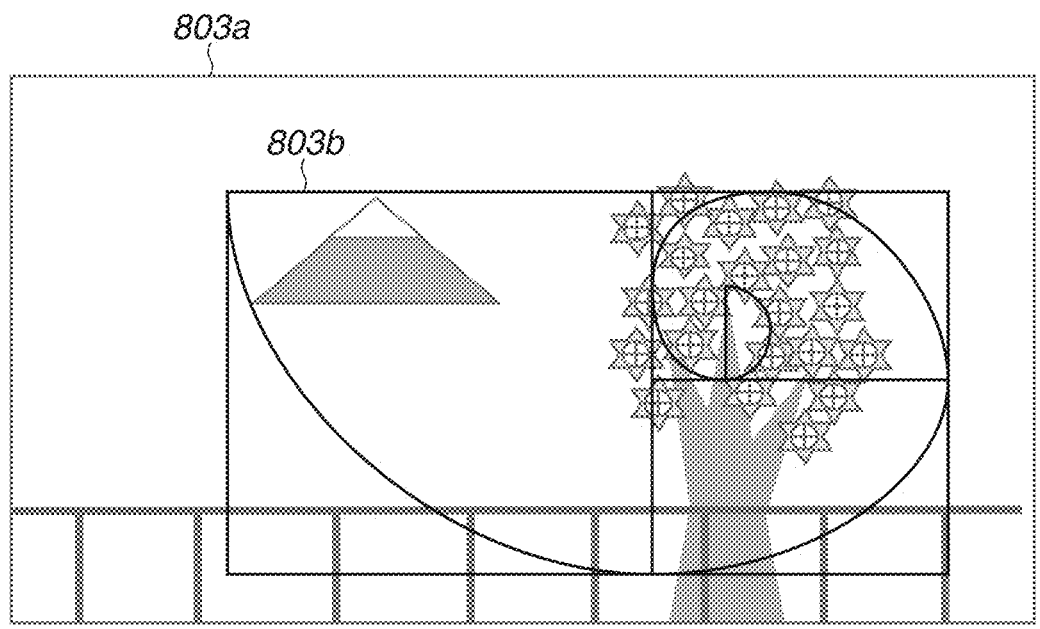
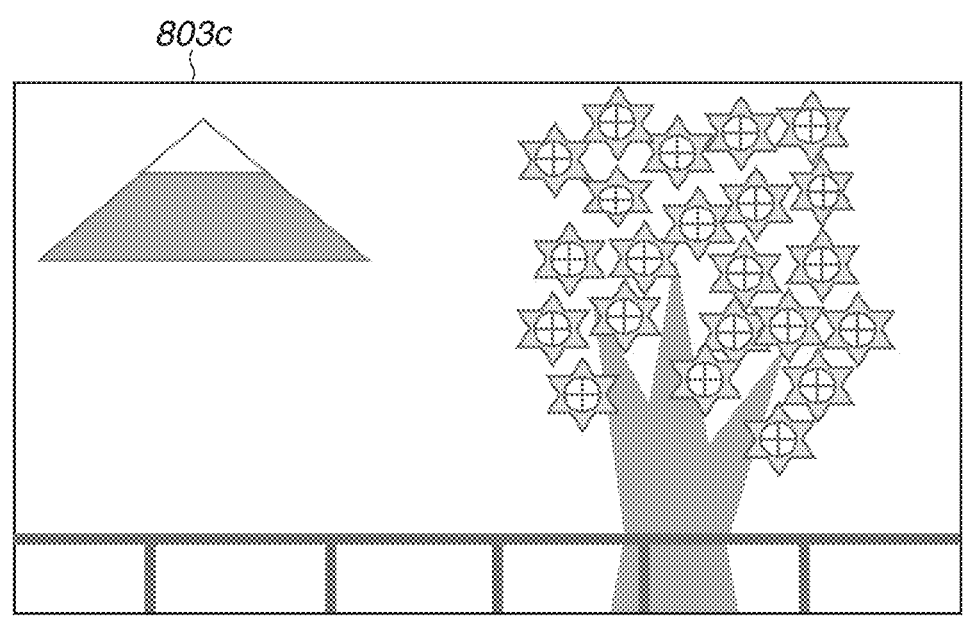

ELECTRONIC APPARATUS, METHOD FOR CONTROLLING THE SAME, AND COMPUTER-READABLE STORAGE MEDIUM STORING PROGRAM

BACKGROUND

Field of the Disclosure

The present disclosure relates to an electronic apparatus that controls imaging using a plurality of camera units, a method for controlling the electronic apparatus, and a computer-readable storage medium storing a program.

Description of the Related Art

Japanese Patent Application Laid-Open No. 2020-162139 discusses an imaging apparatus that includes a plurality of lens units and simultaneously records images captured by the respective lens units.

When a user performs imaging using an electronic apparatus that includes a plurality of camera units configured to capture images with different angles of view, the user adjusts a subject position, an imaging direction, and a zoom magnification of each of the camera units so as to obtain desired compositions. In this case, there is an issue where it takes time and labor to view and manually adjust each of the images to be captured by the plurality of camera units.

SUMMARY

According to an aspect of the present disclosure, An electronic apparatus including a plurality of camera units configured to capture images with different angles of view, the electronic apparatus includes one or more memories, and one or more processors in communication with the one or more memories, wherein the one or more processors and the one or more memories are configured to acquire a plurality of live-view images by starting imaging processing using the plurality of camera units, set cut-out ranges for the respective plurality of live-view images, perform control to display, on a screen, a plurality of first cut-out images generated by performing cut-out processing on the respective plurality of live-view images based on the set cut-out ranges, select one of the plurality of first cut-out images, identify a camera unit corresponding to the selected first cut-out image among the plurality of camera units used in the imaging processing, acquire a captured image by performing imaging processing using the identified camera unit, and perform control to record, in a recording medium, a second cut-out image generated by performing cut-out processing on the captured image based on a cut-out range corresponding to the selected first cut-out image among the set cut-out ranges.

Further features of various embodiments will become apparent from the following description of exemplary embodiments with reference to the attached drawings.

BRIEF DESCRIPTION OF THE DRAWINGS

FIGS. 1A to 1C are diagrams each illustrating an example of an external appearance of a smartphone.

FIG. 4 is a flowchart illustrating an example of an operation by the smartphone.

FIG. 5 is a flowchart illustrating an example of an operation by the smartphone.

FIG. 7 is a diagram illustrating examples of a golden ratio pattern.

FIG. 8 is a diagram illustrating a feature point and the golden ratio pattern.

DESCRIPTION OF THE EMBODIMENTS

Figure 2:
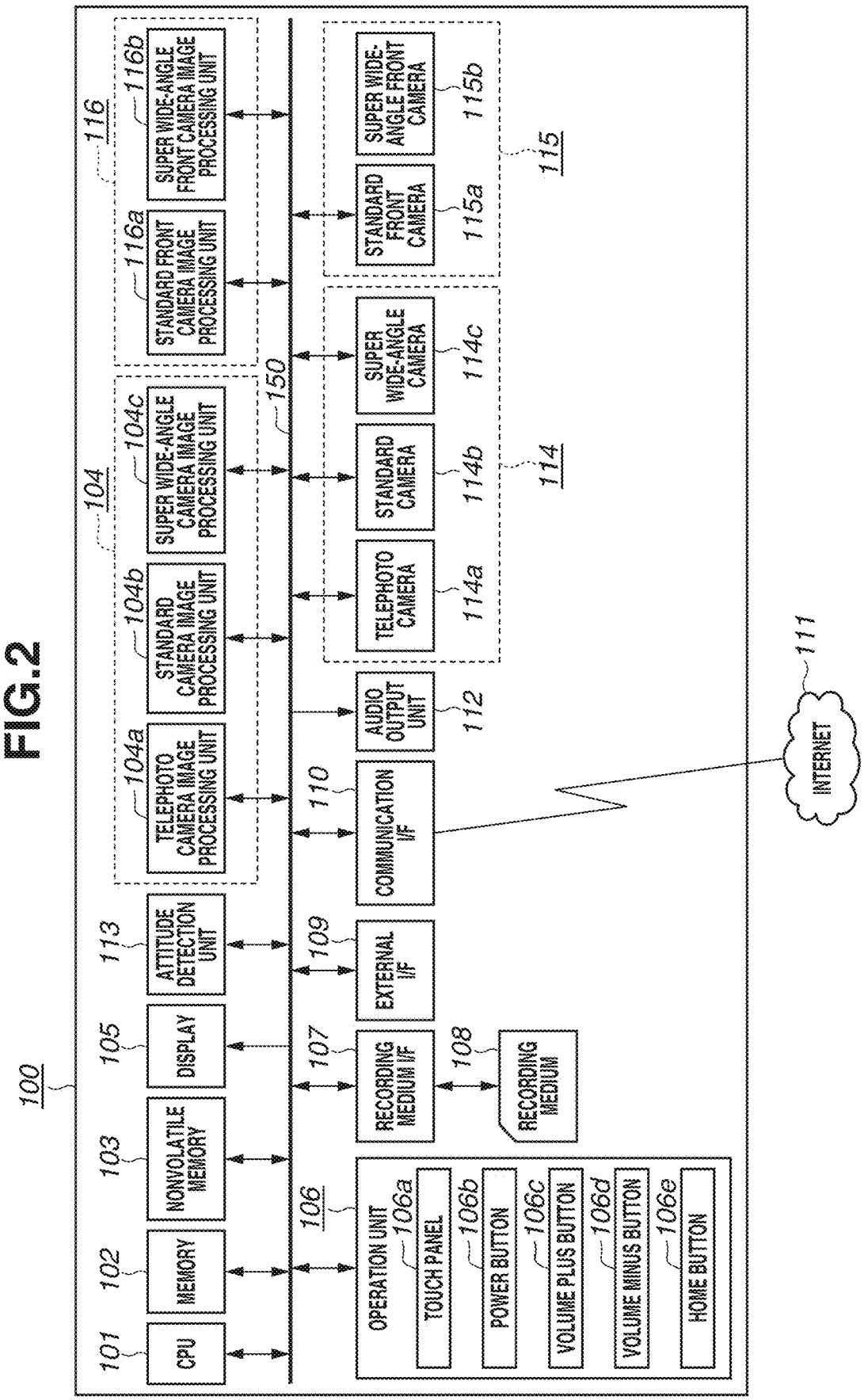
FIG. 2 is a block diagram illustrating an example of a hardware configuration of the smartphone.

Exemplary embodiments of the present disclosure will be described in detail below with reference to the drawings. Components described in the exemplary embodiments are merely examples, and do not intend to limit the scope of every embodiment.

FIGS. 1A to 1C each illustrate an external appearance of a smartphone 100 as an example of an apparatus (an electronic apparatus) to which a first exemplary embodiment of the present disclosure is applicable. FIG. 1A is a front view of the smartphone 100, FIG. 1B is a rear view of the smartphone 100, and FIG. 1C is a front view of the smartphone 100 that has another configuration including two front cameras (described below). In FIGS. 1A and 1C, a display 105 is a display unit provided on a front surface of the smartphone 100 and configured to display an image and various kinds of information. A touch panel 106a is a touch operation member and can detect a touch operation performed on a display surface (an operation surface) of the display 105. The smartphone 100 includes, as camera units, rear cameras 114 and one or more front cameras 115, and can display a live-view image (an LV image) captured by any of the rear cameras 114 and the front camera(s) 115 on the display 105. The rear cameras 114 include a telephoto camera 114a, a standard camera 114b, and a super wide-angle camera 114c (which will be described below). A power button 106b is an operation member included in an operation unit 106, and can turn on or off the light of the display 105. When the power button 106b is continuously pressed (held down) for a certain time, for example, three seconds, the smartphone 100 can be powered on or off. A volume plus button 106c and a volume minus button 106d are used to control the volume of a sound output from an audio output unit 112. When the volume plus button 106c is pressed, the volume increases. When the volume minus button 106d is pressed, the volume decreases. In an imaging standby state during use of any of the rear cameras 114 and the front camera(s) 115, the volume plus button 106c or the volume minus button 106d functions as a shutter button for giving an imaging instruction when pressed. A user can optionally set a specific function so that the function can be executed when the power button 106b and the volume minus button 106d are simultaneously pressed or when the volume minus button 106d is quickly pressed several times. A home button 106e is an operation button for displaying, on the display 105, a home screen that is a startup screen of the smartphone 100. When the home button 106e is pressed while various applications are started up and used on the smartphone 100, the applications can be temporarily closed and the home screen can be displayed. While the home button 106e is assumed to be a physical button that can be pressed in the present exemplary embodiment, the home button 106e may instead be a touchable button having a similar function and displayed on the display 105. An audio output terminal 112a is an earphone jack, and outputs a sound to an earphone, an external speaker, or the like. A speaker 112b is a built-in speaker that outputs a sound. In a case where a sound is output from the smartphone 100 while a terminal for outputting a sound, such as an earphone cord, is not attached to the audio output terminal 112a, the sound is output from the speaker 112b.

FIG. 2 is a block diagram illustrating a configuration example of the smartphone 100 according to the present exemplary embodiment. A central processing unit (CPU) 101, a memory 102, a nonvolatile memory 103, rear camera image processing units 104, the display 105, the operation unit 106, a recording medium interface (I/F) 107, an external I/F 109, and a communication I/F 110 are connected to an internal bus 150. Further, the audio output unit 112, an attitude detection unit 113, the rear cameras 114, the front cameras 115, and front camera image processing units 116 are also connected to the internal bus 150. The components connected to the internal bus 150 can mutually exchange data via the internal bus 150.

The CPU 101 is a control unit that controls the entire smartphone 100 and includes at least one processor or circuit. The memory 102 includes, for example, a random access memory (RAM) such as a volatile memory using a semiconductor device. The CPU 101 controls the components of the smartphone 100 using the memory 102 as a work memory based on programs stored in the nonvolatile memory 103, for example. The nonvolatile memory 103 stores data such as image data and audio data, various kinds of programs for operation of the CPU 101, and the like. The nonvolatile memory 103 includes, for example, a flash memory or a read only memory (ROM). In the present exemplary embodiment, the nonvolatile memory 103 stores camera imaging application program software.

The rear camera image processing units 104 perform various kinds of image processing and subject recognition processing on images captured by the rear cameras 114 under the control of the CPU 101. The rear camera image processing units 104 include a telephoto camera image processing unit 104a, a standard camera image processing unit 104b, and a super wide-angle camera image processing unit 104c that are respectively provided for the telephoto camera 114a, the standard camera 114b, and the super wide-angle camera 114c. Each of the rear camera image processing units 104 performs processing on an image captured by the corresponding one of the rear cameras 114. While each of the three rear cameras 114 is provided with one image processing unit in the present exemplary embodiment, the rear camera image processing units 104 may not necessarily be provided individually for the rear cameras 114. Any two of the three rear cameras 114 may share one image processing unit, or the three rear cameras 114 may share one image processing unit. Likewise, the front camera image processing units 116 perform processing on images captured by the front cameras 115. The front cameras 115 include a standard front camera 115a and a super wide-angle front camera 115b. The front camera image processing units 116 include a standard front camera image processing unit 116a and a super wide-angle front camera image processing unit 116b that are respectively provided for the standard front camera 115a and the super wide-angle front camera 115b. Each of the front camera image processing units 116 performs processing on an image captured by the corresponding one of the front cameras 115. While each of the two front cameras 115 is provided with one image processing unit similarly to the rear cameras 114 in the present exemplary embodiment, the front camera image processing units 116 may not necessarily be provided individually for the front cameras 115. The two front cameras 115 may share one image processing unit. Further, while the configuration including the two front cameras 115 is illustrated as an example in FIG. 2, one front camera 115 or three or more front cameras 115 may be included in the smartphone 100. Each of the rear camera image processing units 104 and the front camera image processing units 116 can also perform various kinds of image processing on an image stored in the nonvolatile memory 103 or a recording medium 108, a video signal acquired via the external I/F 109, and an image acquired via the communication I/F 110. The image processing performed by each of the rear camera image processing units 104 and the front camera image processing units 116 includes analog-to-digital (A/D) conversion processing, digital-to-analog (D/A) conversion processing, encoding processing, compression processing, decoding processing, enlargement/reduction processing (resizing processing), noise reduction processing, and color conversion processing on image data. Each of the rear camera image processing units 104 and the front camera image processing units 116 may include a dedicated circuit block for performing specific image processing. The rear camera image processing units 104 may be integrated into one processing block, and may perform parallel processing or time-division processing to collectively process the images captured by the respective rear cameras 114. Depending on the type of image processing, the CPU 101 can perform the image processing based on programs without using the rear camera image processing units 104 and the front camera image processing units 116.

The display 105 displays an image, a graphical user interface (GUI) screen including a GUI, and the like under the control of the CPU 101. The CPU 101 generates a display control signal based on a program and controls the components of the smartphone 100 to generate a video signal for displaying a video image on the display 105 and output the video signal to the display 105. The display 105 displays the video image based on the output video signal. The smartphone 100 may be configured to include an interface for outputting a video signal for displaying a video image on the display 105 and not to include the display 105. In this case, the display 105 may be an external monitor (e.g., a television).

The operation unit 106 is an input device that receives user operations. Examples of the input device include a character information input device such as a keyboard, a pointing device such as a mouse or a touch panel (e.g., the touch panel 106a), buttons, a dial, a joystick, a touch sensor, and a touch pad. The touch panel 106a is an input device that is superimposed in a flat manner on the display 105 and outputs coordinate information based on a touched position. The operation unit 106 includes the touch panel 106a, the power button 106*b*, the volume plus button 106*c*, the volume minus button 106*d*, and the home button 106*e* described above.

The recording medium 108 such as a memory card, a compact disc (CD), and a digital versatile disc (DVD) can be attached to the recording medium I/F 107. The recording medium I/F 107 reads and writes data from and to the attached recording medium 108 under the control of the CPU 101. The recording medium 108 may be a storage built in the smartphone 100. The external I/F 109 is an interface that is connected to an external apparatus by a wired cable or wirelessly and performs input and output of video signals and audio signals. The communication I/F 110 is an interface that communicates with an external apparatus, the Internet 111, and the like to transmit and receive various kinds of data such as files and commands.

The audio output unit 112 outputs sounds of a moving image and music data, an operation sound, a ringtone, various kinds of notification sounds, and the like. While the audio output unit 112 includes the audio output terminal 112*a* for connection of an earphone, and the speaker 112*b* in the present exemplary embodiment, a sound may be output by wireless communication or the like.

The attitude detection unit 113 detects an attitude of the smartphone 100 with respect to a gravity direction, and inclination of the attitude with respect to each of yaw, roll, and pitch axes. Based on the attitude detected by the attitude detection unit 113, it is possible to determine whether the smartphone 100 is held horizontally or vertically, faces upward or downward, is inclined, or the like. As the attitude detection unit 113, at least one of an acceleration sensor, a gyro sensor, a geomagnetic sensor, an azimuth sensor, and an altitude sensor can be used, or a plurality of these sensors can be used in combination.

The rear cameras 114 are disposed on a side opposite to the display 105 side in a housing of the smartphone 100. The telephoto camera 114*a* has a longer focal length than that of the standard camera 114*b* and can perform imaging on a more telephoto side than the standard camera 114*b*. The super wide-angle camera 114*c* has a shorter focal length than that of the standard camera 114*b* and can perform imaging at a wider angle than the standard camera 114*b*. In other words, the super wide-angle camera 114*c*, the standard camera 114*b*, and the telephoto camera 114*a* have a shorter focal length and a wider angle of view in this order. While in the present exemplary embodiment, the telephoto camera 114*a* is assumed to include a lens with a mechanism that optically zooms an image by a predetermined magnification, the telephoto camera 114*a* may include a lens with a mechanism that enables the user to change the magnification. The front cameras 115 are disposed to be flush with the display 105 in the housing of the smartphone 100. The telephoto camera 114*a*, the standard camera 114*b*, and the super wide-angle camera 114*c* can simultaneously perform imaging operations. While the three rear cameras 114 can simultaneously perform the imaging operations as described above, all of the three rear cameras 114 may not necessarily perform the imaging operations simultaneously. Any two of the three rear cameras 114 may perform the imaging operations simultaneously, or one of the three rear cameras 114 may independently perform the imaging operation.

Any two of the rear cameras 114 and the front camera(s) 115 can also simultaneously perform the imaging operations. While any two of the rear cameras 114 and the front camera(s) 115 can simultaneously perform the imaging operations as described above, the two cameras may not necessarily perform the imaging operations simultaneously, and one camera can independently perform the imaging operation. Further, a mechanism including the plurality of front cameras 115 as illustrated in FIG. 1C can be used. In this case as well, the plurality of front cameras 115 can simultaneously perform the imaging operations, or one of the front cameras 115 may independently perform the imaging operation.

Any of captured live-view images can be displayed on the display 105.

In a case where the live-view images captured by a plurality of cameras among the rear cameras 114 and the front camera(s) 115 are simultaneously displayed, the plurality of live-view images is displayed on the display 105 as illustrated in FIGS. 3A to 3J. In this case, rectangular live-view images are arranged on the display 105 in FIGS. 3A to 3J, but each of the live-view images may be cut out in a shape such as a circular shape and displayed. While a case where three or two live-view images are simultaneously displayed is illustrated, the number of live-view images simultaneously displayed is not particularly limited. Further, sizes of display regions of the live-view images may be equal to each other or different from each other.

The operation unit 106 includes the touch panel 106*a*. The CPU 101 can detect the following operations performed on the touch panel 106*a* and the following states.

Operation in which a finger or a pen that has not been in touch with the touch panel 106*a* newly touches the touch panel 106*a*, namely, start of a touch (hereinafter referred to as a touch-down)

State where the finger or the pen is in touch with the touch panel 106*a* (hereinafter referred to as a touch-on)

Operation in which the finger or the pen is moving while being in touch with the touch panel 106*a* (hereinafter referred to as a touch-move)

Operation in which the finger or the pen in touch with the touch panel 106*a* is released from the touch panel 106*a*, namely, end of the touch (hereinafter referred to as a touch-up)

State where nothing is in touch with the touch panel 106*a* (hereinafter referred to as a touch-off)

When the touch-down is detected, the touch-on is detected simultaneously. Unless the touch-up is detected after the touch-down, the touch-on is normally detected continuously. When the touch-move is detected, the touch-on is also detected simultaneously. Even when the touch-on is detected, the touch-move is not detected unless the touched position moves. When the touch-up of all the fingers or the pens in touch with the touch panel 106*a* is detected, the touch-off is detected.

The CPU 101 is notified of information such as these operations and states, and position coordinates where the finger or the pen is in touch with the touch panel 106*a*, via the internal bus 150. The CPU 101 determines what kind of operation (touch operation) has been performed on the touch panel 106*a* based on the information.

As for the touch-move, a moving direction of the finger or the pen moving on the touch panel 106*a* can also be determined for each of vertical and horizontal components on the touch panel 106*a* based on a change in the position coordinates. In a case where the touch-move with a predetermined distance or more is detected, the CPU 101 determines that a slide operation has been performed. An operation of quickly moving a finger by a certain distance while touching the touch panel 106*a* with the finger and immediately releasing the finger therefrom is referred to as a flick. In other words, the flick is the operation of quickly moving a finger along the touch panel 106*a* as if flipping the touch panel 106*a* with the finger. When the touch-move performed at a predetermined speed or more for a predetermined distance or more is detected and the touch-up is subsequently detected, it can be determined that the flick has been performed (it can be determined that the flick has been performed subsequent to the slide operation). Further, a touch operation of simultaneously touching a plurality of positions (e.g., two points) and bringing the touched positions close to each other is referred to as a pinch-in, and a touch operation of moving the touched positions away from each other is referred to as a pinch-out. The pinch-out and the pinch-in are collectively referred to as a pinch operation (or simply referred to as a pinch). As the touch panel 106*a*, any of various types of touch panels, such as a resistive film type, an electrostatic capacitance type, a surface acoustic wave type, an infrared-ray type, an electromagnetic induction type, an image recognition type, and an optical sensor type may be used. There are touch detection methods such as a method that detects a touch operation when there is contact with the touch panel 106*a* and a method that detects a touch operation when the finger or the pen is approaching the touch panel 106*a*, but any of the methods may be used.

The electronic apparatus according to the present exemplary embodiment may be implemented by a single computer apparatus, or implemented by distributing the functions to a plurality of computer apparatuses as appropriate. In a case where the electronic apparatus includes the plurality of computer apparatuses, the computer apparatuses are communicably connected to each other via a local area network (LAN), Bluetooth®, or the like. For example, the display 105 and the rear cameras 114 may be distributed and housed in different computer apparatuses.

An example of an operation performed by the smartphone 100 according to the present exemplary embodiment at the time of imaging will be described with reference to a flowchart in FIG. 4. The operation is implemented by the CPU 101 of the smartphone 100 reading out and executing the camera imaging application software stored in the memory 102, and controlling the modules.

First, in response to an operation performed by the user, the CPU 101 starts up the camera imaging application software, and displays a screen of the camera imaging application software on the display 105.

In step S401, the CPU 101 determines whether a multiple imaging instruction has been received, based on an operation performed by the user. For example, an icon for receiving the multiple imaging instruction is displayed on the screen of the camera imaging application software. When a tap operation on this icon is detected, the CPU 101 determines that the multiple imaging instruction has been received.

In a case where the CPU 101 determines that the multiple imaging instruction has been received (YES in step S401), the processing proceeds to step S402. In step S402, the CPU 101 performs imaging processing by simultaneously driving at least two of the telephoto camera 114*a*, the standard camera 114*b*, and the super wide-angle camera 114*c*. In step S403, the CPU 101 acquires two or more live-view images from the at least two of the rear cameras 114. In step S404, the CPU 101 performs cut-out range setting processing (described below) on the acquired two or more live-view images. In step S405, the CPU 101 performs cut-out processing for cutting out a range set in step S404 from each of the live-view images acquired from the at least two of the rear cameras 114, and performs display control to display a list of cut-out live-view images as illustrated in FIGS. 3A to 3J. At this time, the CPU 101 displays the list by selecting at least one image generated by the cut-out processing on each of the live-view images acquired from the at least two of the rear cameras 114.

In step S406, the CPU 101 selects one of the plurality of live-view images in the list based on an operation performed by the user. In step S407, the CPU 101 identifies a camera used in the imaging processing and corresponding to the selected live-view image, and performs imaging processing by driving the identified camera. Even with the same camera, a captured image acquired by the imaging processing performed in step S407 may be higher in resolution than the live-view images acquired by the imaging processing in step S402. In this case, a cut-out image obtained as a result of cut-out processing in step S408 (described below) is also higher in resolution than the cut-out images obtained as the results of the cut-out processing and displayed in step S405.

In step S408, the CPU 101 performs the cut-out processing on the captured image acquired in step S407 with the same conditions as those for the live-view image selected in step S406. For example, in a case where the live-view image selected in step S406 is obtained by cutting out the original image to an angle-of-view size with a zoom magnification of 1.5, using a face region of a certain person as a center, the cut-out processing is also performed on the captured image acquired in step S407 with the same conditions.

In step S409, the CPU 101 performs recording control to record, in the recording medium 108, a cut-out image obtained by the cut-out processing in step S408. The processing then ends.

Next, an operation performed by the CPU 101 in the cut-out range setting processing on the live-view image acquired from each of the at least two of the rear cameras 114 in step S404 will be described with reference to a flowchart in FIG. 5. Processing in this flowchart is performed for each of the at least two of the rear cameras 114 that have started the imaging processing in step S402.

In step S501, the CPU 101 acquires, from each of the at least two of the rear cameras 114, a live-view image with the minimum zoom magnification thereof, i.e., a live-view image with the maximum angle of view capturable thereby. In step S502, the CPU 101 performs subject recognition processing on the live-view image. In step S503, the CPU 101 determines whether a subject other than a person and an animal is included in the live-view image, based on a result of the subject recognition processing.

In a case where a subject other than a person and an animal is included in the live-view image (YES in step S503), the processing proceeds to step S504. In step S504, the CPU 101 performs processing for detecting a feature point of the subject, and determines the presence or absence of the feature point. For example, the CPU 101 detects feature points (601*a* and 601*b*) illustrated in FIG. 6 by recognizing colors included in the live-view image, detecting regions where a color difference occurs, and detecting edges.

In a case where the feature point of the subject has been detected from the live-view image (YES in step S504), the processing proceeds to step S505. In step S505, the CPU 101 checks the detected feature point against golden ratio patterns 702*a* to 702*d* illustrated in FIG. 7. The golden ratio patterns 702*a* to 702*d* illustrated in FIG. 7 are examples of a composition based on a common ratio at which most people feel beautiful. Information about such golden ratio patterns is previously stored in the nonvolatile memory 103. In step S505, the CPU 101 sets a part of the live-view image as the cut-out range by determining a region where the detected feature point is substantially coincident with any of the golden ratio patterns 702a to 702d. For example, in a live-view image 803a illustrated in FIG. 8, a range 803b is a region determined to be coincident with one of the golden ratio patterns 702a to 702d, and a cut-out image 803c is obtained as a result of cutting out the range 803b from the live-view image 803a.

In a case where no feature point of the subject has been detected from the live-view image (NO in step S504), the processing proceeds to step S506. In step S506, the CPU 101 sets a part of the live-view image as the cut-out range based on a predetermined condition. For example, the predetermined condition is that a range with an electronic zoom magnification of 2 and with the center of the angle of view of the live-view image as a center is set as the cut-out range, or each of ranges obtained by dividing the live-view image into four is set as the cut-out range.

Figure 9:
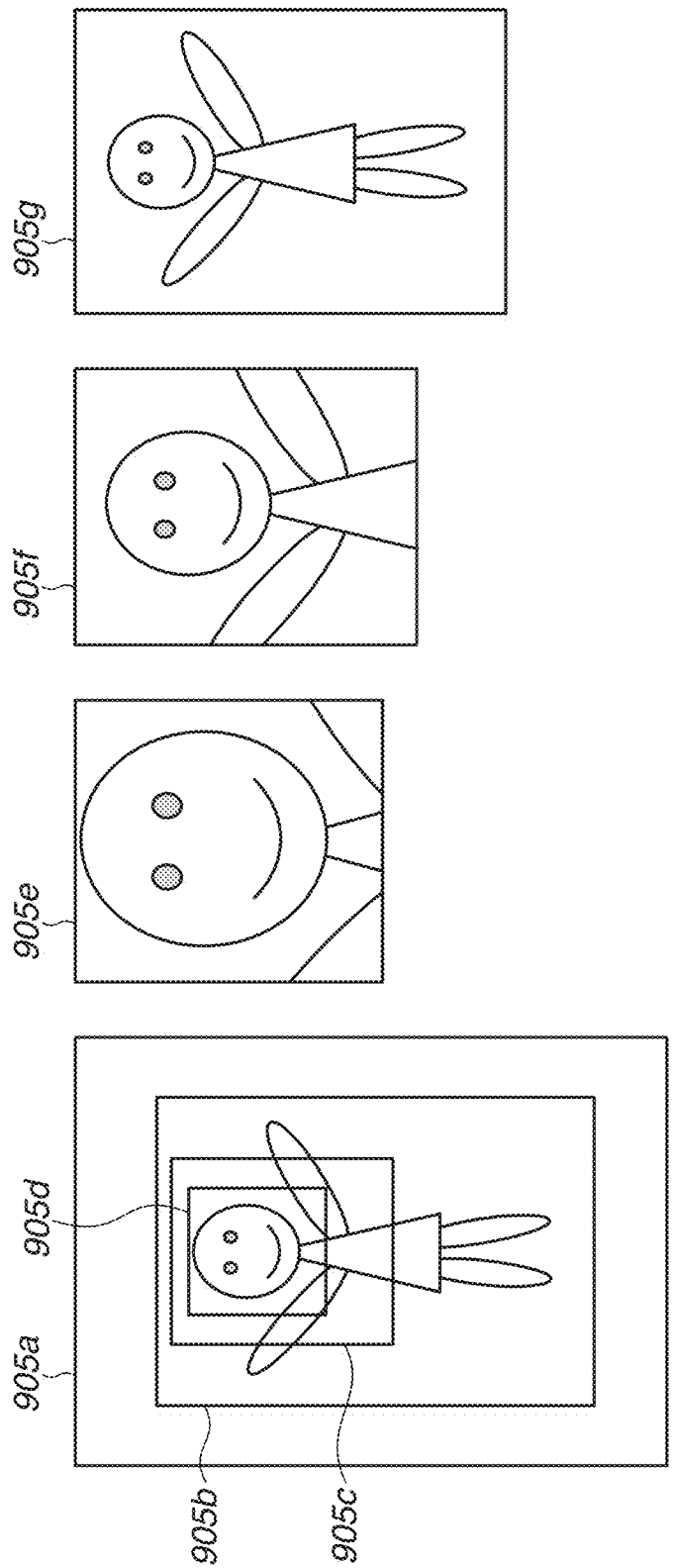
FIG. 9 is a diagram illustrating cut-out ranges based on a face region.
Figure 10:
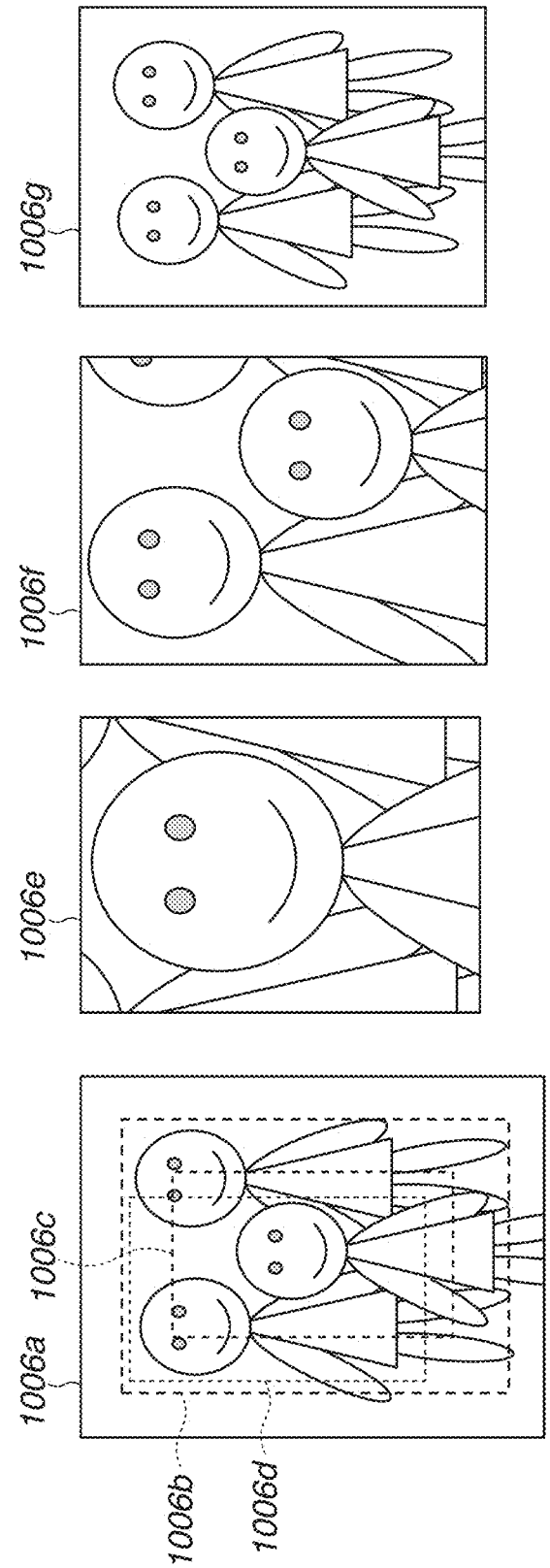
FIG. 10 is a diagram illustrating cut-out ranges based on face regions.

In a case where a subject other than a person and an animal is not included in the live-view image (NO in step S503), the processing proceeds to step S507. In step S507, the CPU 101 performs processing for detecting a face region of a person or an animal from the live-view image. In step S508, the CPU 101 sets the cut-out range based on the detected face region. For example, as illustrated in FIG. 9, in a live-view image 905a, a face region 905d, an upper body region 905c including the face region 905d, and a full body region 905b including the face region 905d are set as the cut-out ranges. Then, cut-out images 905e, 905f, and 905g are obtained as results of cutting out the set ranges from the live-view image 905a. In a case where a plurality of persons or animals is included in the live-view image, the cut-out range is set for each combination of adjacent persons or animals as illustrated in FIG. 10. In a live-view image 1006a, a region 1006c including one of a plurality of persons, a region 1006d including adjacent two persons, and a region 1006b including adjacent three persons are set as the cut-out ranges. Then, cut-out images 1006e, 1006f, and 1006g are obtained as results of cutting out the set ranges from the live-view image 1006a. Further, a pupil region may further be detected from the face region, and the cut-out range may be set with the pupil region as a center.

The processing in FIG. 5 is performed for each of the rear cameras 114. Thus, images with different electromagnetic zoom magnifications and different cut-out ranges (angles of view) are generated for the plurality of rear cameras 114.

After steps S505 to S508, the set cut-out range may be displayed on the live-view image, and may be moved or changed (adjusted) in size by user operation.

According to the present exemplary embodiment, in a case where an electronic apparatus includes a plurality of cameras configured to capture video images with different angles of view, the user can promptly view the composition capturable by each of the cameras without taking time and labor during imaging preparation (during live-view image display).

A second exemplary embodiment will be described. Descriptions of configurations similar to those in the first exemplary embodiment will be omitted.

In the present exemplary embodiment, in a case where at least two of the three rear cameras 114, i.e., the telephoto camera 114a, the standard camera 114b, and the super wide-angle camera 114c are simultaneously driven, control to display a plurality of images with different angles of view on the display 105 and derive an optimum angle of view will be described.

Figure 11:
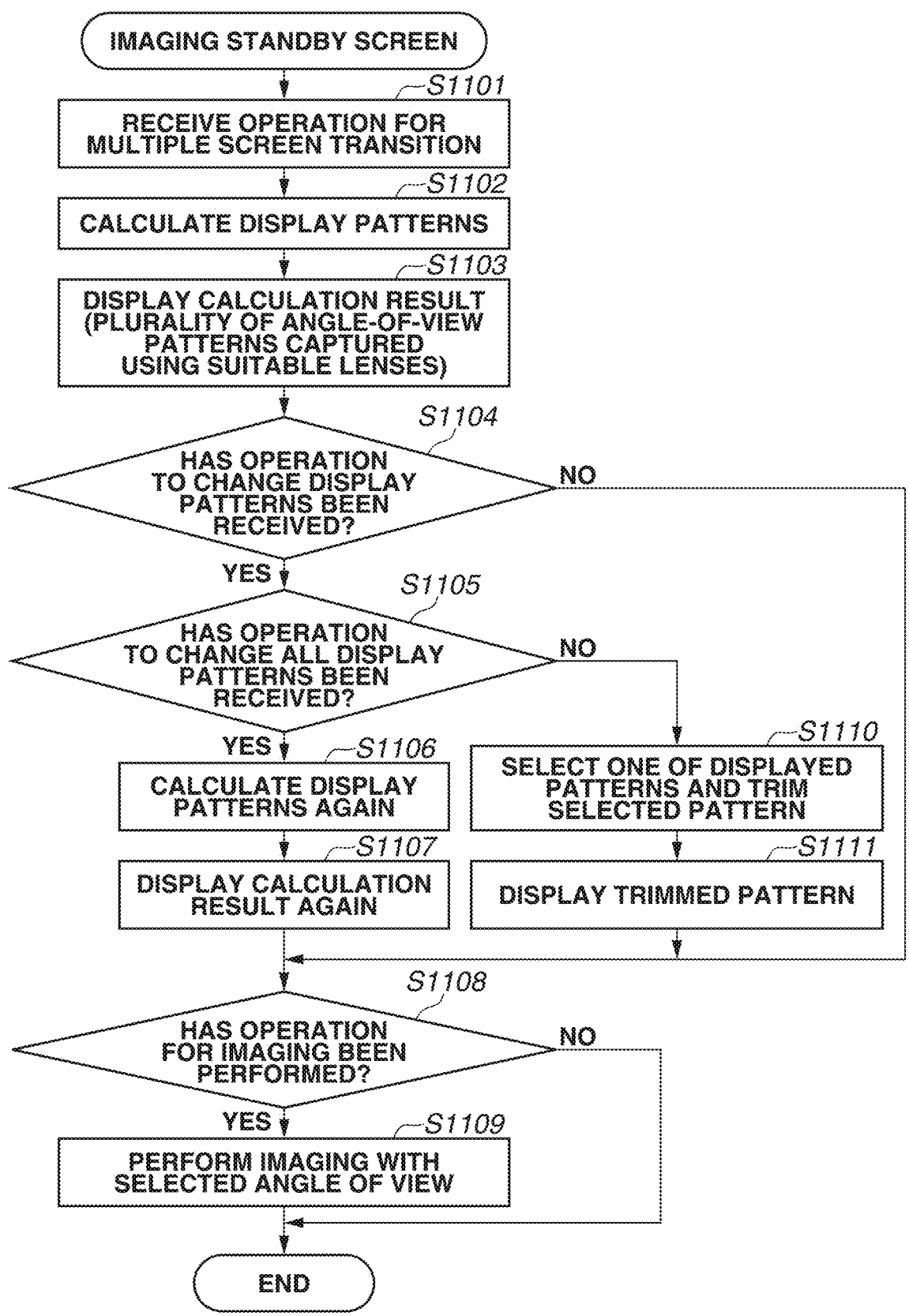
FIG. 11 is a flowchart illustrating an example of an operation by the smartphone.

FIG. 11 is a flowchart of control processing for driving the rear cameras 114 and the rear camera image processing units 104, displaying a plurality of images with different angles of view on the display 105, and deriving the optimum angle of view.

The control processing is implemented by the CPU 101 of the smartphone 100 executing the programs stored in the nonvolatile memory 103.

The flowchart in FIG. 11 is started when the smartphone 100 is in the imaging standby state after the camera application is started up on the smartphone 100.

In step S1101, upon receiving an operation for multiple screen transition, the CPU 101 starts driving the three rear camera image processing units 104 (104a to 104c) for the telephoto camera 114a, the standard camera 114b, and the super wide-angle camera 114c. The operation for multiple screen transition may be any operation using the operation unit 106.

In step S1102, the CPU 101 calculates display patterns to be simultaneously displayed on the display 105. The calculation method will be described with reference to flowcharts in FIGS. 12 and 14.

Figure 12:
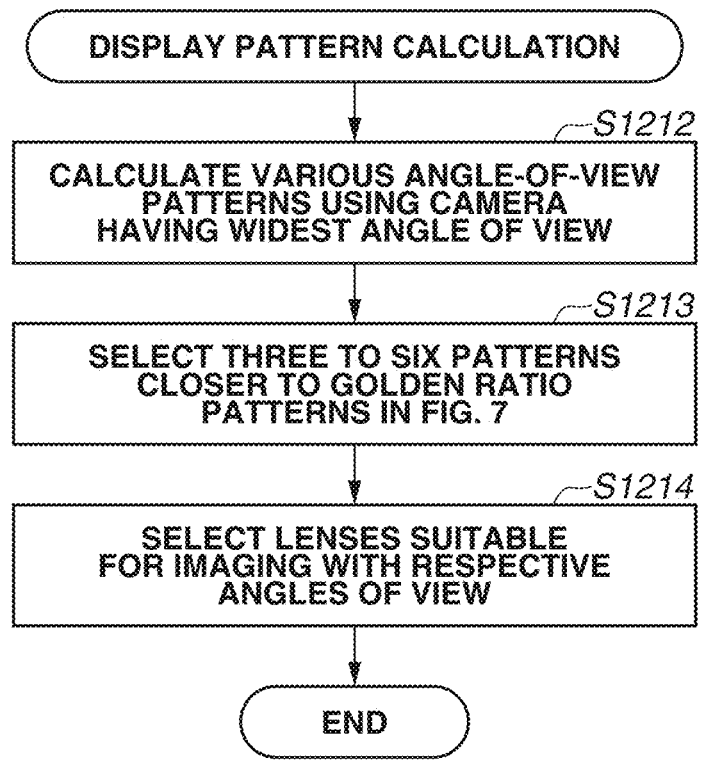
FIG. 12 is a flowchart illustrating an example of an operation by the smartphone.

FIG. 12 illustrates the calculation method using the rear camera (the super wide-angle camera 114c in present exemplary embodiment) that can perform imaging with the widest angle of view.

In step S1212, the CPU 101 calculates various patterns from a captured live-view image, using the rear camera (the super wide-angle camera 114c in present exemplary embodiment) that can perform imaging with the widest angle of view. The method for calculating the various patterns is illustrated in detail in a flowchart of FIG. 13.

Figure 13:
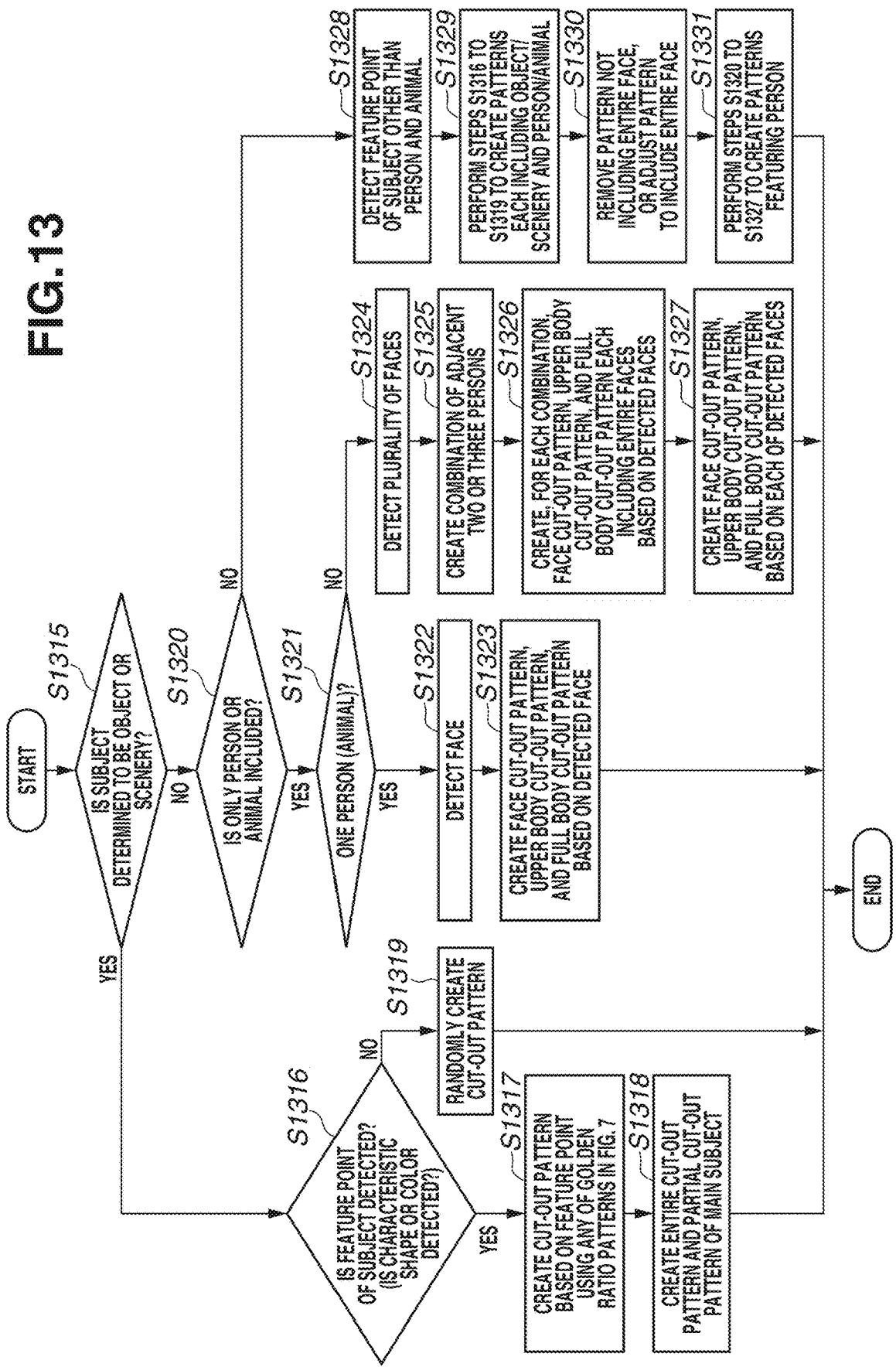
FIG. 13 is a flowchart illustrating an example of an operation by the smartphone.

Referring to an example of the calculation method in FIG. 13, in step S1315, the CPU 101 determines whether a subject to be imaged is an object or scenery, or a person or an animal. In a case where the subject is determined to be an object or scenery (YES in step S1315), the processing proceeds to step S1316.

Figure 6:
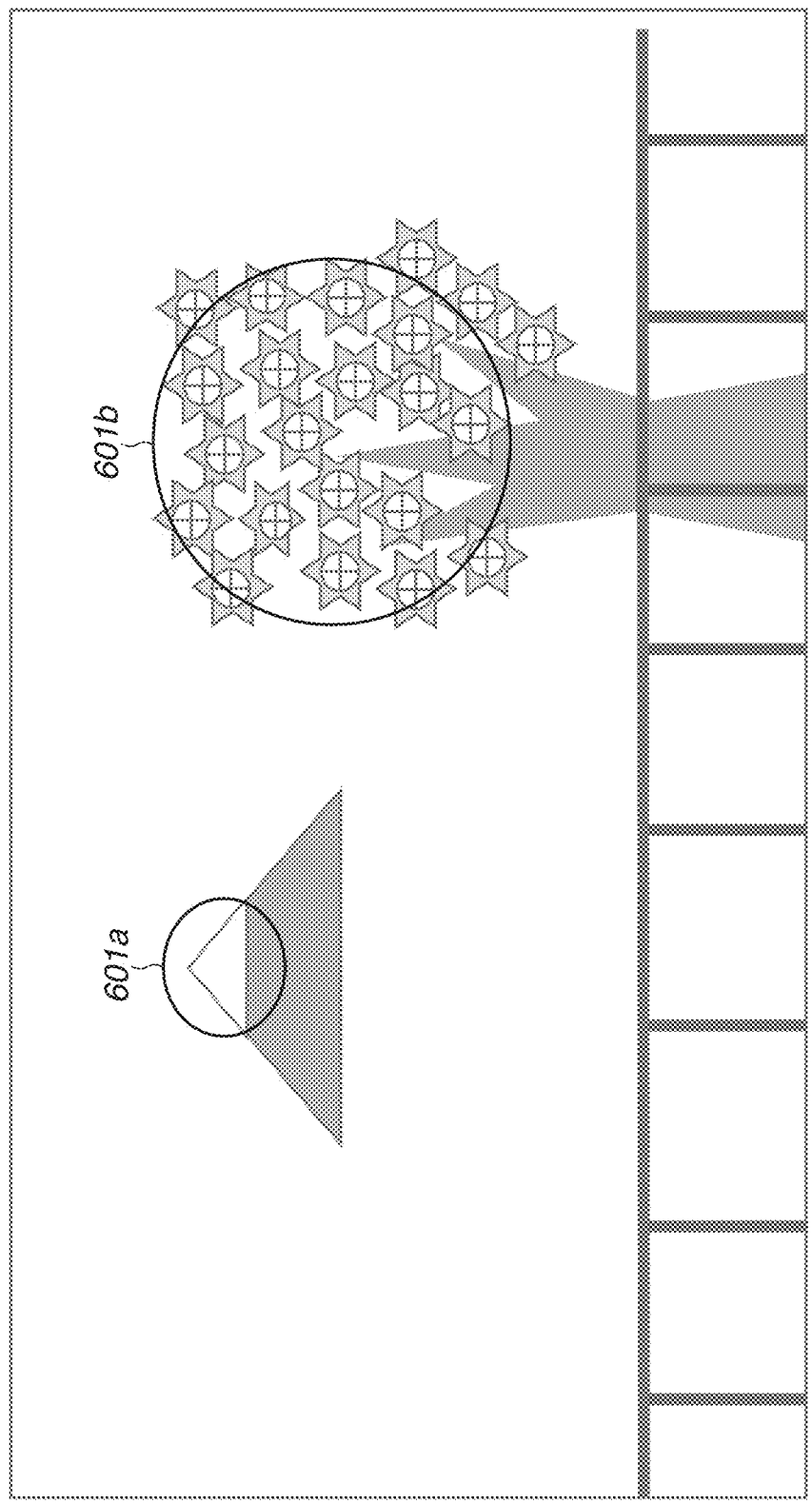
FIG. 6 is a diagram illustrating feature point detection.

In step S1316, the CPU 101 performs feature point detection processing to determine whether a feature point of the subject is detected. As illustrated in FIG. 6, the CPU 101 detects portions of the subject having a characteristic shape or color as the feature points 601a and 601b, from the live-view image captured by the rear camera that can perform imaging with the widest angle of view.

In a case where the feature point has been detected (YES in step S1316), the processing proceeds to step S1317. In step S1317, a cut-out pattern is created based on the feature point, using any of the golden ratio patterns 702a to 702d illustrated in FIG. 7. The feature point detected in step S1316 is combined with the composition of any of the golden ratio patterns 702a to 702d in FIG. 7 (see the range 803b in FIG. 8), and learning is performed to obtain the angle of view closer to the composition of any of the golden ratio patterns 702a to 702d and then calculate the cut-out pattern (see the cut-out image 803c in FIG. 8).

Figure 15:
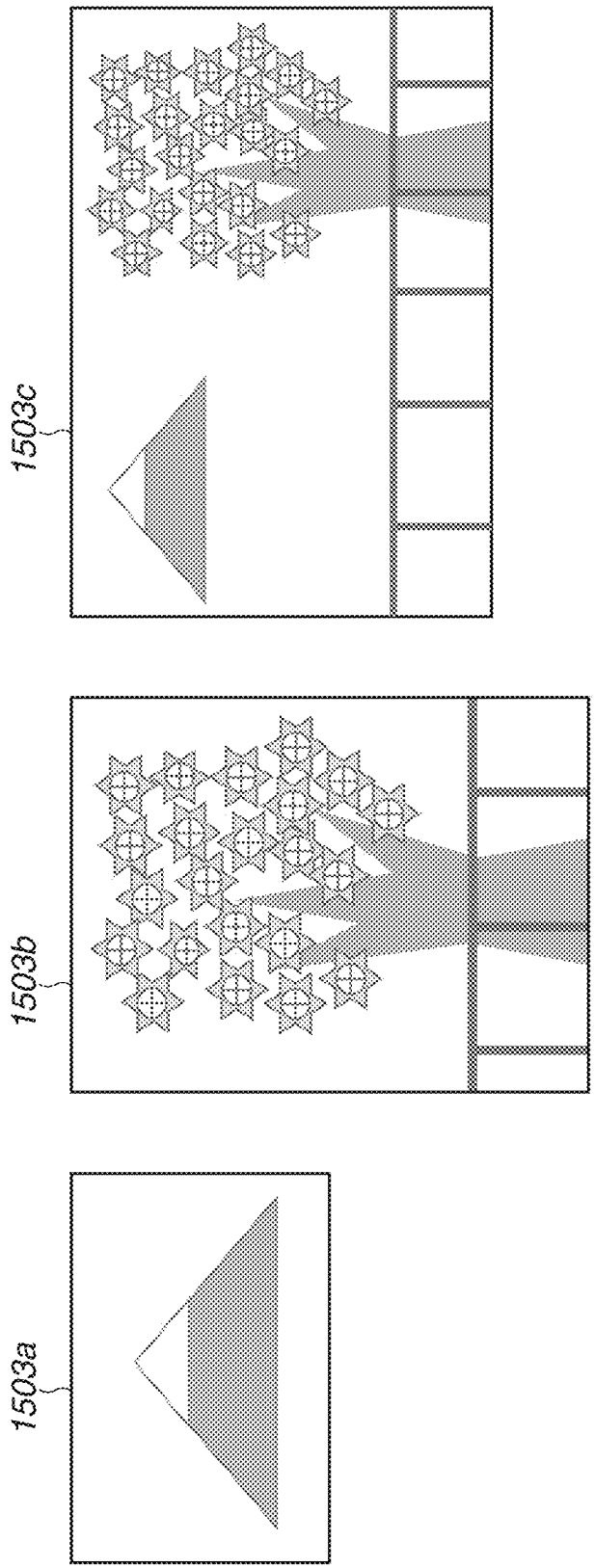
FIG. 15 is a diagram illustrating examples of a cut-out image.

In step S1318, an entire cut-out pattern and a partial cut-out pattern of a main subject are created. For example, in the case of the live-view image in FIG. 6, cut-out patterns 1503a, 1503b, and 1503c in FIG. 15 are created.

In a case where no feature point has been detected (NO in step S1316), the processing proceeds to step S1309. In step S1309, the live-view image is regarded as a general scenery image, and cut-out patterns are randomly created.

In a case where the subject is determined to be a person or an animal (NO in step S1315), the processing proceeds to step S1320.

In step S1320, the CPU 101 determines whether only a person or an animal is included in the live-view image. In a case where the CPU 101 determines that only a person or an animal is included in the live-view image (YES in step S1320), the processing proceeds to step S1321.

In step S1321, the CPU 101 determines whether the number of subjects is one. In a case where the number of subjects is one (YES in step S1321), the processing proceeds to step S1322.

In step S1322, the CPU 101 detects the face.

In step S1323, as illustrated in FIG. 9, the face region 905d, the upper body region 905c, and the full body region 905b are created as the cut-out ranges from the live-view image 905a with the original angle of view, based on the face detected in step S1322. Then, the cut-out images 905e, 905f, and 905g are obtained as the results of cutting out the set ranges from the live-view image 905a.

In a case where the number of subjects is two or more (NO in step S1321), the processing proceeds to step S1324. In step S1324, the CPU 101 detects a plurality of faces.

In step S1325, the CPU 101 creates a combination of adjacent persons or animals. In the example of FIG. 10, a combination of two persons and a combination of three persons are created.

In step S1326, a face cut-out pattern, an upper body cut-out pattern, and a full body cut-out pattern each including the entire faces are created based on the detected faces, for each of the combinations created in step S1325.

In step S1327, similarly to step S1323 performed in the case of one subject, the CPU 101 creates, for each of the detected faces, a face cut-out pattern, an upper body cut-out pattern, and a full body cut-out pattern based on each of the detected faces.

In a case where the CPU 101 determines that a subject other than a person and an animal is included in the live-view image (NO in step S1320), the processing proceeds to step S1328. In step S1328, the CPU 101 detects a feature point of the subject other than a person and an animal from the live-view image.

In step S1329, the CPU 101 performs processing similar to the processing in steps S1316 to S1319 to create cut-out patterns each including the object/scenery and the person/animal.

In step S1330, the CPU 101 removes a pattern not including the entire face from the patterns created in step S1329, or finely adjusts the pattern to include the entire face.

In step S1331, the CPU 101 performs processing similar to the processing in steps S1320 to S1327 to create cut-out patterns featuring a person, in addition to the patterns created in steps S1328 to S1330.

The number of patterns created in steps S1315 to S1331 is predetermined and is, for example, four to ten.

Returning to FIG. 12, in step S1213, the CPU 101 selects a predetermined number (e.g., three to six) of patterns closer to any of the golden ratio patterns 702a to 702d in FIG. 7, from among the patterns created in steps S1315 to S1331.

Figure 16:
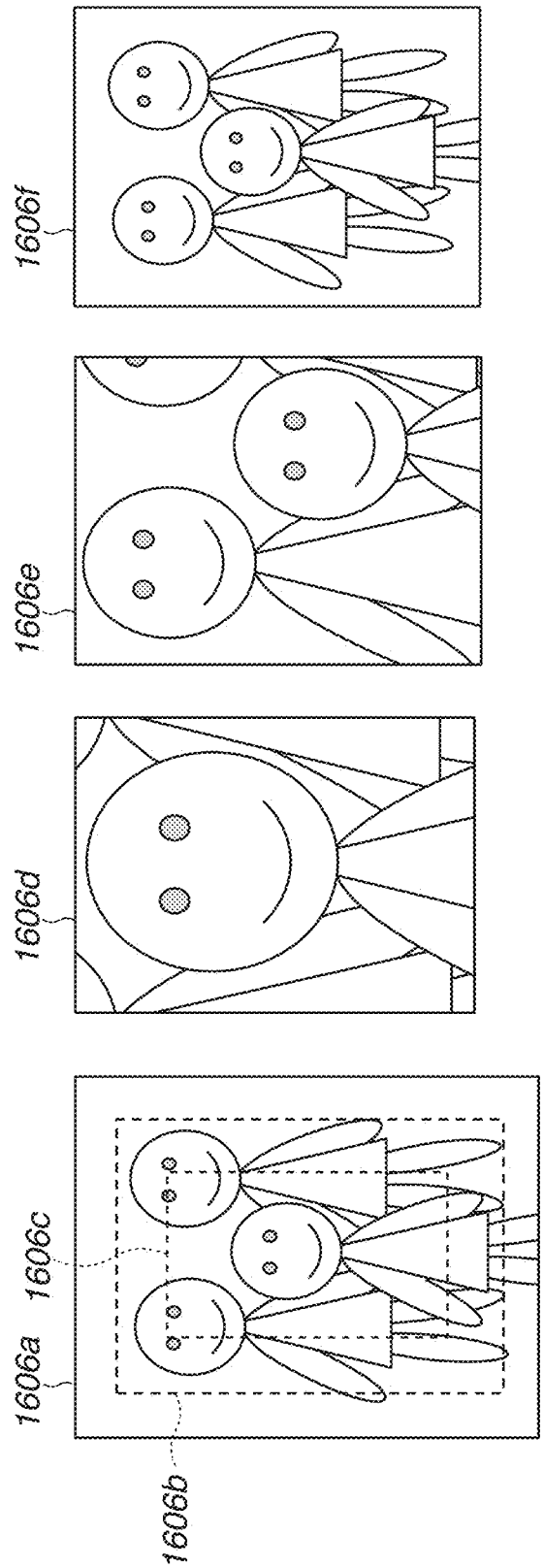
FIG. 16 is a diagram illustrating cut-out ranges based on face regions.

In step S1214, the CPU 101 selects the lenses suitable for imaging with the respective angles of view, i.e., the cameras not causing deterioration of image quality. In a case where the telephoto camera 114a is usable, the telephoto camera 114a is used. In a case where the entire subject is not within the angle of view of the telephoto camera 114a, the standard camera 114b is used. In a case where the entire subject is not within the angle of view of the standard camera 114b, the super wide-angle camera 114c is used. In a case where a sense of blurring suitable for a portrait can be obtained using the telephoto camera 114a and another camera (the standard camera 114b or the super wide-angle camera 114c), these cameras are used. For example, a live-view image 1606a in FIG. 16 is an image captured at the angle of view of the super wide-angle camera 114c, a live-view image 1606b is an image captured at the angle of view of the standard camera 114b, and a live-view image 1606c is an image captured at the angle of view of the telephoto camera 114a. It is assumed that cut-out patterns 1606d to 1606f are created in steps S1315 to S1331. In the case of the cut-out pattern 1606d having the angle of view corresponding to an upper body of one person, the upper body is within the angle of view of the telephoto camera 114a, and thus the imaging is performed by the telephoto camera 114a. In the case of the cut-out pattern 1606e having the angle of view corresponding to upper bodies of two persons, the upper bodies are within the angle of view of the standard camera 114b, and thus the imaging is performed by the standard camera 114b. In the case of the cut-out pattern 1606f having the angle of view corresponding to entire bodies of three persons, the imaging is performed by the super wide-angle camera 114c.

While the example of how to calculate the optimum angle of view has been described with reference to steps S1212 to S1214, the CPU 101 may derive the optimum angle of view by storing an optimum composition in the nonvolatile memory 103 and performing another machine learning. Alternatively, the CPU 101 may derive the optimum angle of view by storing the previous imaging styles of the user in the nonvolatile memory 103 and performing learning in advance. Further alternatively, the CPU 101 may learn or derive the optimum angle of view by accessing an external apparatus via the recording medium I/F 107, the external I/F 109, or the communication I/F 110. Yet further alternatively, the CPU 101 may acquire an angle of view learned or calculated by an external apparatus, via the communication I/F 110. Yet further alternatively, the CPU 101 may derive the optimum angle of view using any other method.

Figure 14:
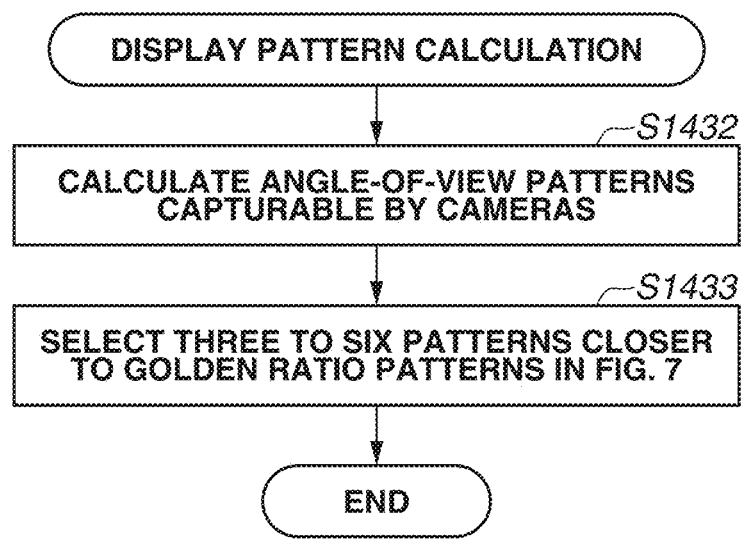
FIG. 14 is a flowchart illustrating an example of an operation by the smartphone.

FIG. 14 illustrates a method of calculating angle-of-view patterns capturable by the respective rear cameras 114 (the telephoto camera 114a, the standard camera 114b, and the super wide-angle camera 114c in present exemplary embodiment), and deriving a plurality of angles of view.

In step S1432, the CPU 101 calculates various angle-of-view patterns from captured live-view images, using the respective rear cameras 114 (the telephoto camera 114a, the standard camera 114b, and the super wide-angle camera 114c in present exemplary embodiment). The CPU 101 may perform the calculation using a method similar to steps S1315 to S1331, or may drive the optimum angle of view by storing an optimum composition in the nonvolatile memory 103 and performing another machine learning. Alternatively, the CPU 101 may learn or derive the optimum angle of view by accessing an external apparatus via the recording medium I/F 107, the external I/F 109, or the communication I/F 110. Further alternatively, the CPU 101 may acquire the angle of view learned or calculated by an external apparatus, via the communication I/F 110. Yet further alternatively, the CPU 101 may derive the optimum angle of view using any other method.

In step S1433, the CPU 101 selects three to six patterns closer to any of the golden ratio patterns 702a to 702d in FIG. 7, from among the patterns created in step S1432.

Returning to FIG. 11, in step S1103, the plurality of display patterns derived in step S1102 is displayed on the display 105. FIGS. 3A to 3J illustrate specific examples of how to display the patterns.

Figure 3A:
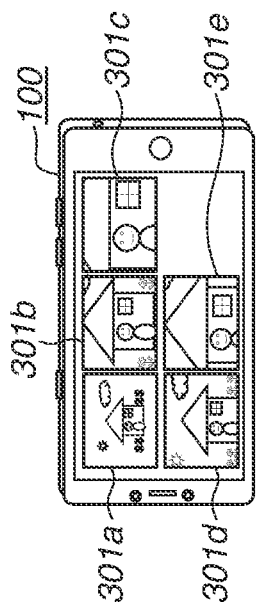
FIGS. 3A to 3J are diagrams each illustrating an example of a screen displayed on a display of the smartphone.

In FIG. 3A, as a result of the calculation, display patterns 301a to 301c with the original angles of view of the respective rear cameras 114 (the super wide-angle camera 114c, the standard camera 114b, and the telephoto camera 114a in present exemplary embodiment) are displayed. In addition, display patterns 301d and 301e with electronic zoom magnifications are displayed.

Figure 3B:
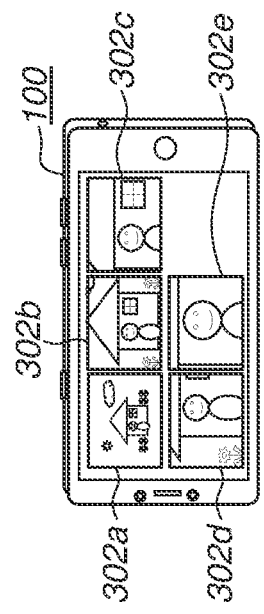

In FIG. 3B, as a result of the calculation, display patterns 302a to 302c with the original angles of view of the respective rear cameras 114 (the super wide-angle camera 114c, the standard camera 114b, and the telephoto camera 114a in present exemplary embodiment) are displayed. In addition, display patterns 302d and 302e obtained by trimming the respective images captured by the super wide-angle camera 114c and the standard camera 114b are displayed.

Figure 3C:
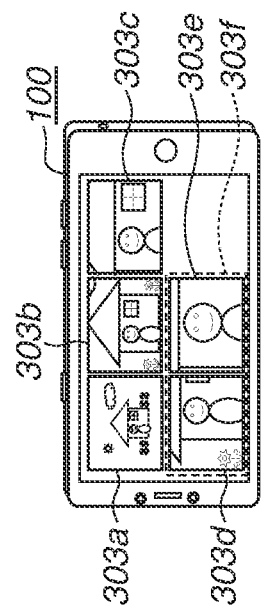

In FIG. 3C, an enclosure 303f is displayed in addition to the patterns illustrated in FIG. 3B, which enables display patterns 303a to 303c with the original angles of view of the respective rear cameras 114 and display patterns 303d and 303e with the other angles of view to be displayed in a distinguishable manner.

Figure 3D:
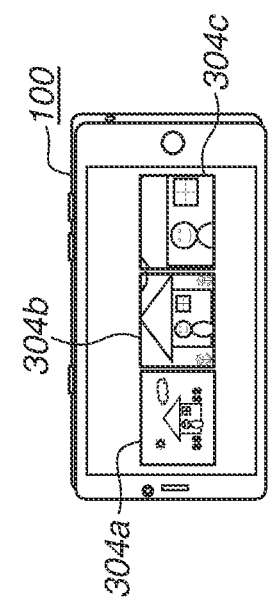
Figure 3E:
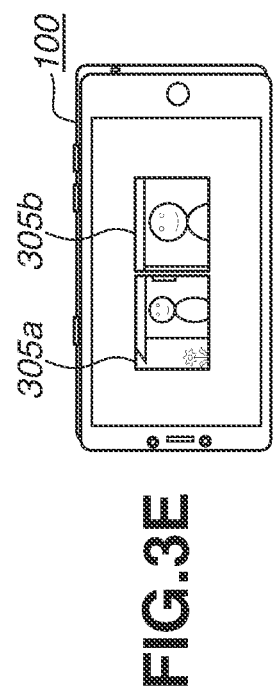

In FIGS. 3D and 3E, display patterns 304a to 304c with the original angles of view of the respective rear cameras 114 and display patterns 305a and 305b with the other angles of view are displayed, respectively. Switching between the display in FIG. 3D and the display in FIG. 3E enables the display patterns 304a to 304c and the display patterns 305a and 305b to be distinguished from each other.

Figure 3F:
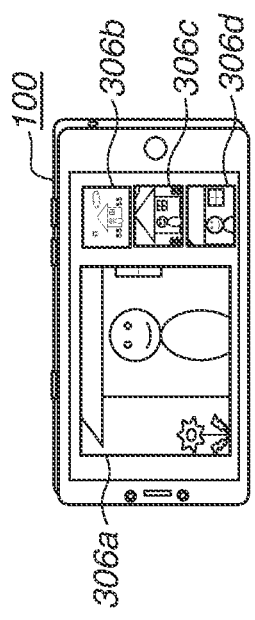

In FIG. 3F, among display patterns 306a to 306d derived in step S1102, the display pattern 306a recognized as optimum by the CPU 101 is largely displayed.

Figure 3G:
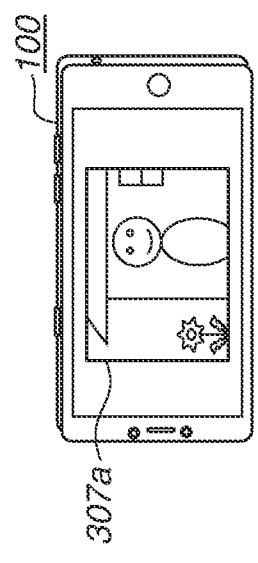

In FIG. 3G, among display patterns derived in step S1102, only a display pattern 307a recognized as optimum by the CPU 101 is displayed.

Figure 3H:
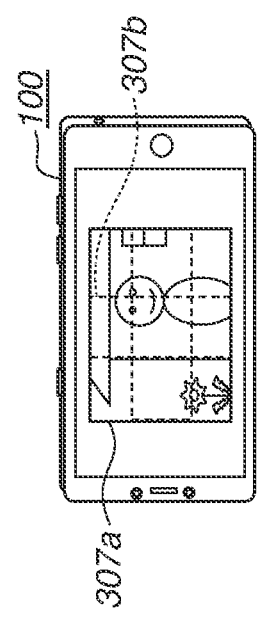

In FIG. 3H, among display patterns derived in step S1102, the display pattern 307a recognized as optimum by the CPU 101 is displayed with a guide 307b indicating a reason why the display pattern 307a is recognized as optimum.

In FIGS. 3A to 3J, the display patterns are each displayed in a square shape, but may each be displayed in any other shape (e.g., a circular shape). The display patterns may be displayed large or small, and the number of display patterns is not particularly limited.

Returning to FIG. 11, in step S1104, the CPU 101 determines whether an operation to change the display patterns has been received via any member of the operation unit 106. In a case where the operation has been received (YES in step S1104), the processing proceeds to step S1105. In a case where the operation has not been received (NO in step S1104), the processing proceeds to step S1108.

In step S1105, the CPU 101 determines whether, in a case where the operation to change the display patterns is performed, the operation to change all the display patterns has been received via any member of the operation unit 106.

For example, the touch panel 106a receives the operation when the touch-on and the touch-up are performed on the screen of the touch panel 106a. In a case where the operation to change all the display patterns has not been received (NO in step S1105), the processing proceeds to step S1110. In a case where the operation to change all the display patterns has been received (YES in step S1105), the processing proceeds to step S1106.

In step S1106, the CPU 101 calculates display patterns again to change all the display patterns. The processing is similar to the processing in step S1102.

In step S1107, the CPU 101 displays a result of the calculation again. The processing is similar to the processing in step S1103.

Figure 3I:
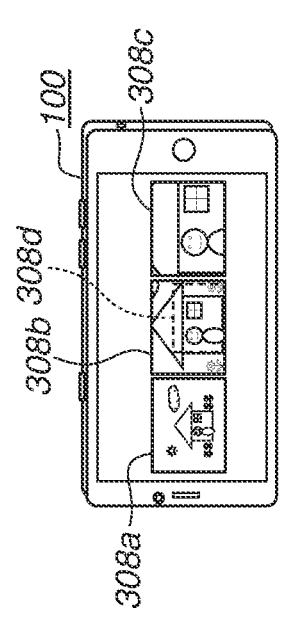
Figure 3J:
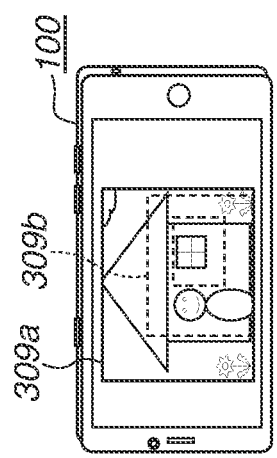

Processing in step S1110 is performed in a case where the operation to change any of the display patterns is received in step S1105, i.e., in a case where the operation to change all the display patterns is not received in step S1105. As illustrated in FIG. 3I, among display patterns 308a to 308c displayed on the display 105 in step S1103, the user performs the touch-on, the touch-move, and the touch-up on, for example, the display pattern 308b. As a result, the display pattern 308b can be trimmed to a portion 308d that the user desires to image and the angle of view can be adjusted. In FIG. 3J, a display pattern 309a can be trimmed to a portion 309b in a similar manner. While the example in which the touch panel 106a is used to perform the operation has been described, any other operation method using the operation unit 106 may be adoptable as long as the user can trim an image to obtain the intended angle of view.

In step S1111, the CPU 101 changes the angle of view and displays the trimmed pattern.

In step S1108, the CPU 101 determines whether an operation for imaging has been performed. The operation can be performed via any member of the operation unit 106. In a case where an operation for imaging has been performed (YES in step S1108), the processing proceeds to step S1109. In a case where an operation for imaging has not been performed (NO in step S1108), the processing ends.

In step S1109, the CPU 101 performs imaging with the angle of view selected by the operation in step S1108.

According to the exemplary embodiments of the present disclosure, in a case where imaging is performed using an electronic apparatus including a plurality of camera units configured to capture images with different angles of view, it is possible to perform imaging with a desired composition without taking time and labor.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-036303, which was filed on Mar. 9, 2022 and which is hereby incorporated by reference herein in its entirety.

What is claimed is:

1. An electronic apparatus including a plurality of camera units configured to capture images with different angles of view, the electronic apparatus comprising:
one or more memories; and
one or more processors in communication with the one or more memories, wherein the one or more processors and the one or more memories are configured to:
acquire a plurality of live-view images by starting imaging processing using the plurality of camera units;
set cut-out ranges for the respective plurality of live-view images;
perform control to display, on a screen, a plurality of first cut-out images generated by performing cut-out processing on the respective plurality of live-view images based on the set cut-out ranges;
select one of the plurality of first cut-out images;
identify a camera unit corresponding to the selected first cut-out image among the plurality of camera units used in the imaging processing;
acquire a captured image by performing imaging processing using the identified camera unit; and
perform control to record, in a recording medium, a second cut-out image generated by performing cut-out processing on the captured image based on a cut-out range corresponding to the selected first cut-out image among the set cut-out ranges.

2. The electronic apparatus according to claim 1, wherein the one or more processors and the one or more memories are further configured to:
perform face region detection processing on the plurality of live-view images; and
set the cut-out ranges based on face regions detected in the face region detection processing.

3. The electronic apparatus according to claim 1, further comprising a storage unit configured to prestore a golden ratio pattern of a composition,
wherein the one or more processors and the one or more memories are further configured to:
perform feature point detection processing on the plurality of live-view images; and
set the cut-out ranges based on feature points detected in the feature point detection processing and the golden ratio pattern.

4. The electronic apparatus according to claim 1, wherein the plurality of first cut-out images displayed on the screen includes at least one cut-out image generated by performing the cut-out processing on each of the plurality of live-view images.

5. The electronic apparatus according to claim 1, wherein the second cut-out image is higher in resolution than the plurality of first cut-out images.

6. A method for controlling an electronic apparatus including a plurality of camera units configured to capture images with different angles of view, the method comprising:
acquiring a plurality of live-view images by starting imaging processing using the plurality of camera units;
setting cut-out ranges for the respective plurality of live-view images;
performing control to display, on a screen, a plurality of first cut-out images generated by performing cut-out processing on the respective plurality of live-view images based on the set cut-out ranges;
selecting one of the plurality of first cut-out images;
identifying a camera unit corresponding to the selected first cut-out image among the plurality of camera units used in the imaging processing;
acquiring a captured image by performing imaging processing using the identified camera unit; and
performing control to record, in a recording medium, a second cut-out image generated by performing cut-out processing on the captured image based on a cut-out range corresponding to the selected first cut-out image among the set cut-out ranges.

7. A non-transitory computer-readable storage medium storing instructions that, when executed by computer, cause the computer to perform operations comprising:
acquiring a plurality of live-view images by starting imaging processing using a plurality of camera units configured to capture images with different angles of view;
setting cut-out ranges for the respective plurality of live-view images;
performing control to display, on a screen, a plurality of first cut-out images generated by performing cut-out processing on the respective plurality of live-view images based on the set cut-out ranges;
selecting one of the plurality of first cut-out images;
identifying a camera unit corresponding to the selected first cut-out image among the plurality of camera units used in the imaging processing;
acquiring a captured image by performing imaging processing using the identified camera unit; and
performing control to record, in a recording medium, a second cut-out image generated by performing cut-out processing on the captured image based on a cut-out range corresponding to the selected first cut-out image among the set cut-out ranges.

* * * * *